United States Patent
Baldo

(10) Patent No.: US 9,648,981 B2
(45) Date of Patent: May 16, 2017

(54) ADJUSTABLE DISPENSING NOZZLE

(71) Applicant: KONINKLIJKE PHILIPS N.V., Eindhoven (NL)

(72) Inventor: Massimo Baldo, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 11 days.

(21) Appl. No.: 14/372,044

(22) PCT Filed: Jan. 16, 2013

(86) PCT No.: PCT/IB2013/050388
§ 371 (c)(1),
(2) Date: Jul. 14, 2014

(87) PCT Pub. No.: WO2013/108185
PCT Pub. Date: Jul. 25, 2013

(65) Prior Publication Data
US 2015/0047742 A1    Feb. 19, 2015

Related U.S. Application Data

(60) Provisional application No. 61/587,184, filed on Jan. 17, 2012.

(51) Int. Cl.
*A47J 31/46* (2006.01)
*A47J 31/44* (2006.01)

(52) U.S. Cl.
CPC .......... *A47J 31/46* (2013.01); *A47J 31/4482* (2013.01)

(58) Field of Classification Search
CPC .............................. A47J 31/46; A47J 31/4482
USPC ... 141/374, 360, 18, 192, 95, 198, 361, 217, 141/244; 222/146.6, 534; 99/292, 280
See application file for complete search history.

(56) References Cited

U.S. PATENT DOCUMENTS 2,710,126 A * 6/1955 Hughes ................... B65B 39/00
137/854
2,763,416 A * 9/1956 Wormser ................ B65B 39/12
141/196

(Continued)

FOREIGN PATENT DOCUMENTS

EP    1639926 A1    3/2006
EP    1867260 B1    5/2010

(Continued)

*Primary Examiner* — Mark A Laurenzi
*Assistant Examiner* — James Hakomaki

(57) ABSTRACT

A beverage producing machine is disclosed, comprising: a housing (3); a supporting surface (23) on which a beverage collecting container (C) can be placed; and a beverage dispensing nozzle (13) arranged above the supporting surface. The machine further comprises a movable auxiliary surface (25) which is combined to the supporting surface and is movable between an operating position and a rest position. In the operating position the movable auxiliary surface is parallel to the supporting surface. In the rest position the movable auxiliary surface is removed from the supporting surface. Moreover the dispensing nozzle (13) is movable between a first position for dispensing a beverage in a container placed on said supporting surface, and a second position for dispensing the beverage in a container placed on the movable auxiliary surface (25).

15 Claims, 4 Drawing Sheets

(56) References Cited

U.S. PATENT DOCUMENTS

| | | | | |
|---|---|---|---|---|
| 3,476,295 A * | 11/1969 | Telfer | ............... | F25D 23/04 |
| | | | | 222/183 |
| 4,469,150 A * | 9/1984 | Grimaldi | ............... | B67D 1/06 |
| | | | | 141/198 |
| 4,610,375 A * | 9/1986 | Germi | ............... | B67D 3/00 |
| | | | | 222/131 |
| 4,869,158 A * | 9/1989 | Brewer | ............... | A47J 31/46 |
| | | | | 99/279 |
| 5,161,455 A * | 11/1992 | Anson | ............... | A47J 31/4482 |
| | | | | 141/378 |
| 6,135,173 A * | 10/2000 | Lee | ............... | F25C 5/005 |
| | | | | 141/351 |
| 7,007,500 B2 | 3/2006 | Lee | ............... | F25C 5/005 |
| | | | | 222/146.6 |
| 7,470,364 B2 * | 12/2008 | Oranski | ............... | B67D 1/001 |
| | | | | 210/198.1 |
| 7,654,192 B2 * | 2/2010 | Oehninger | ............... | A47J 31/4482 |
| | | | | 99/280 |
| 7,757,732 B2 * | 7/2010 | Voglewede | ............... | F25D 23/126 |
| | | | | 141/18 |
| 2005/0056043 A1 * | 3/2005 | Lee | ............... | F25C 5/005 |
| | | | | 62/344 |
| 2007/0017376 A1 | 1/2007 | Oehninger | | |
| 2008/0148950 A1 | 6/2008 | Cahen | | |
| 2008/0148952 A1 * | 6/2008 | Ruckstuhl | ............... | A47J 31/4403 |
| | | | | 99/279 |
| 2008/0178626 A1 * | 7/2008 | Jang | ............... | F25C 1/24 |
| | | | | 62/344 |
| 2008/0272156 A1 * | 11/2008 | Dyson | ............... | A47J 31/4482 |
| | | | | 222/504 |
| 2009/0008404 A1 * | 1/2009 | Kim | ............... | F25C 5/005 |
| | | | | 221/150 R |
| 2009/0266443 A1 * | 10/2009 | Browne-Wilkinson | . | B67D 1/0085 |
| | | | | 141/198 |
| 2009/0308493 A1 * | 12/2009 | Buchstab | ............... | A47J 31/4482 |
| | | | | 141/378 |
| 2010/0242738 A1 * | 9/2010 | Ferraris | ............... | A47J 31/4482 |
| | | | | 99/279 |
| 2011/0174161 A1 * | 7/2011 | Brandle | ............... | A47J 31/4482 |
| | | | | 99/292 |
| 2012/0055582 A1 * | 3/2012 | Miller | ............... | B67D 7/0288 |
| | | | | 141/86 |
| 2012/0305111 A1 * | 12/2012 | Peretti | ............... | A47J 31/4485 |
| | | | | 137/560 |
| 2015/0248441 A1 | 9/2015 | Takagi | | |

FOREIGN PATENT DOCUMENTS

| | | | | |
|---|---|---|---|---|
| EP | | 2394240 | * | 7/2011 |
| EP | | 2548481 | * | 1/2013 |
| JP | | 59174119 A | | 10/1984 |
| WO | WO | 2006015950 | * | 2/2006 |
| WO | | 2006127113 A1 | | 11/2006 |

* cited by examiner

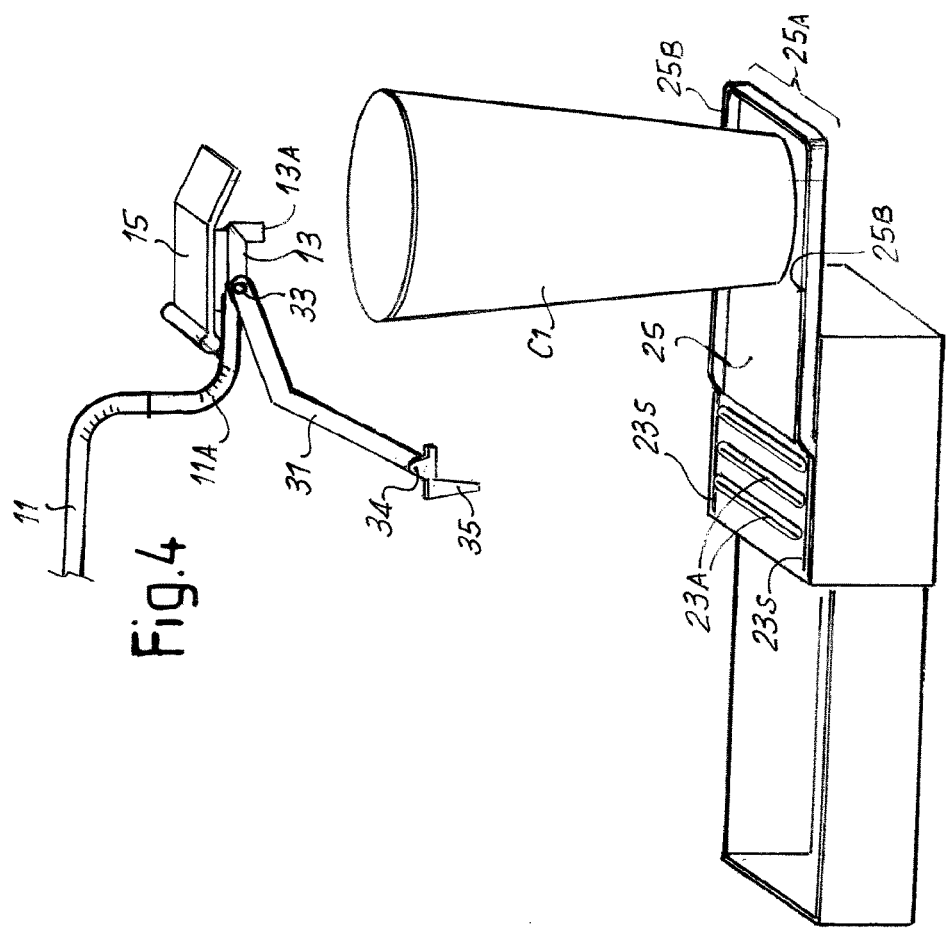
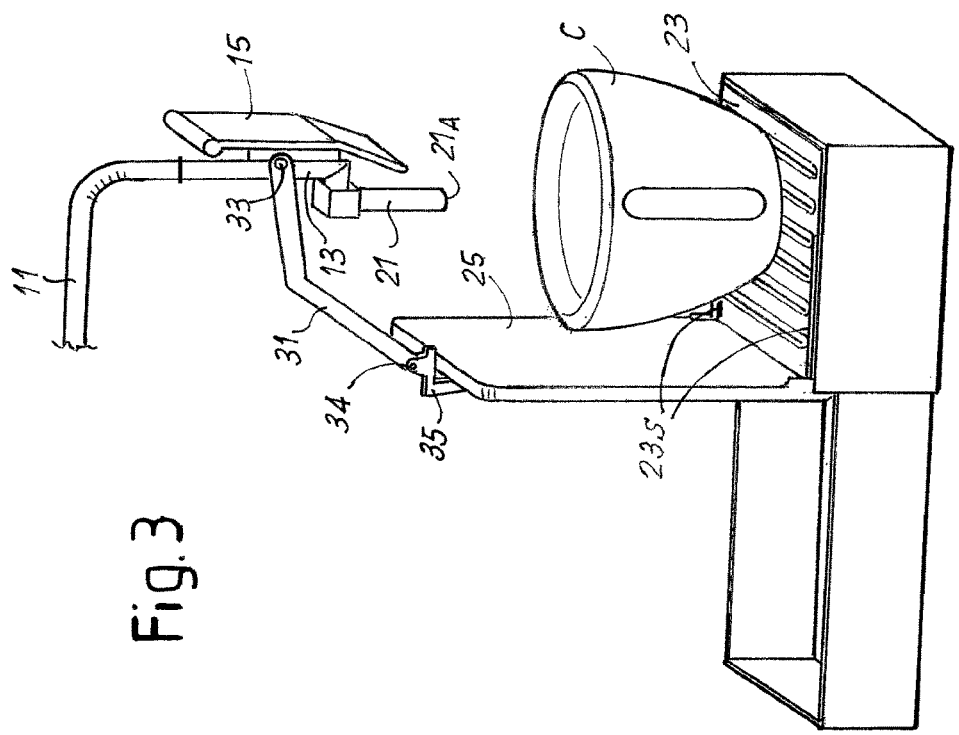

ADJUSTABLE DISPENSING NOZZLE

This application is the U.S. National Phase application under 35 U.S.C. §371 of International Application No. PCT/IB2013/050388, filed on Jan. 16, 2013, which claims the benefit of U.S. Provisional Application No. 61/587,184 filed on Jan. 17, 2012. These applications are hereby incorporated by reference herein.

TECHNICAL FIELD

The present invention concerns beverage producing machines and in particular, though not exclusively, coffee producing machines.

BACKGROUND ART

Coffee producing machines are becoming increasingly popular and widely used household appliances.

These machines are commonly used for the preparation of various kinds of coffee-based beverages, such as espresso coffee, fresh brew coffee (American coffee), cappuccino, "lattemacchiato" and so on. Depending upon the kind of beverage and wishes of the user, the beverage is collected in a smaller or larger container, such as an espresso cup, a large tea or coffee cup or the like. In order to allow the use of containers of widely differing height, machines have been developed which provide for means to adapt the distance between a cup resting or supporting surface and a beverage dispensing nozzle. U.S. Pat. No. 7,654,192 discloses a coffee machine having a vertically adjustable and lockable outflow unit, provided with a rather complex mechanism, to adjust the distance between beverage dispensing nozzle and a cup supporting surface.

EP-A-1639926 discloses a coffee producing machine provided with a beverage dispensing nozzle arranged in a fixed position and a cup supporting surface underneath, which can be adjusted such that the distance between the supporting surface and the beverage dispensing nozzle is adapted to the dimension of the cup or other container arranged under the beverage dispensing nozzle. Also in this case the adjusting mechanism is rather complex and expensive.

Moreover, the means to adjust the distance between the beverage dispensing nozzle and the cup supporting surface of these known machines are cumbersome and requires a rather large housing.

SUMMARY OF THE INVENTION

According to one aspect, the present invention provides a coffee producing machine, or more generally a beverage producing machine comprising simple, inexpensive means to adjust the distance between the rest surface on which the cup is placed and the beverage dispensing nozzle. The object of preferred embodiments of the invention is to provide a beverage producing machine having compact dimensions and still allowing the use of larger and smaller beverage collecting containers or cups.

The invention is defined by the independent claim. The dependent claims define further advantageous embodiments and features of the invention.

According to the invention, a beverage producing machine is provided, comprising: a housing; a supporting surface on which a beverage collecting container can be placed; a beverage dispensing nozzle arranged above said supporting surface. Moreover, a movable auxiliary surface is provided, combined to the supporting surface, said movable auxiliary surface being movable between an operating position, in which said movable auxiliary surface is approximately parallel to said supporting surface and a rest position, in which said movable auxiliary surface is removed from said supporting surface. The dispensing nozzle is movable between a first position for dispensing a beverage, produced by a brewing unit or the like, in a container, placed on the supporting surface, and a second position for dispensing said beverage in a container placed on said movable auxiliary surface.

The arrangement is such that larger containers can be used by bringing the dispensing nozzle and the movable auxiliary surface in a position outside the footprint of the machine. The machine can therefore be designed with very small dimensions and in particular a small footprint. The machine is thus easy to transport and can also be located in areas where little room is available, e.g. a small kitchen. Nevertheless, the machine maintains the possibility of being adapted to dispense the beverage in a large cup or container, by simply tilting the dispensing nozzle and the movable auxiliary surface temporarily in an outwardly projecting position. When not required, the movable auxiliary surface and the dispensing nozzle can be tilted back in the respective rest positions, wherein they do not project outside the footprint of the machine.

In some embodiments, the beverage dispensing nozzle is provided with a tilting motion to be moved from said first position to said second position and vice-versa. Similarly, in exemplary and preferred embodiments, the movable auxiliary surface is pivotable around an axis substantially parallel to the supporting surface, to be moved from the rest position to an operative position and vice versa.

In some embodiments, when in the rest position the movable auxiliary surface is placed adjacent said housing and substantially orthogonal to the supporting surface. In the working position the movable auxiliary surface projects with respect to said housing beyond the supporting surface and in said second position the beverage dispensing nozzle projects from said housing.

According to some embodiments, in the first position the beverage dispensing nozzle is in fluid communication with a spout fixedly arranged in said housing and above said supporting surface, such that the beverage is dispensed from the beverage dispensing nozzle in the spout and from the spout in a container placed on the supporting surface. In the second position the beverage dispensing nozzle is arranged to dispense the beverage from the beverage dispensing nozzle directly in a container placed on the movable auxiliary surface arranged in the operating position.

In some exemplary embodiments the housing has a front portion projecting from a main body and above the supporting surface; and the beverage dispensing nozzle is mounted on said front portion, e.g. in a seat or recess provided in the front portion. In some embodiments, the spout is mounted on the front portion of the housing facing the supporting surface arranged underneath and the movable auxiliary surface is preferably hinged to the main body of the housing underneath said front portion.

When a seat is provided to house the dispensing nozzle when the dispensing nozzle is in the first position, said seat can be provided with a closing door. In preferred embodiments, the beverage dispensing nozzle can be constrained to the door, such that the beverage dispensing nozzle is moved from the first position to the second position and vice-versa by opening and closing said door.

To simplify the adjustment of the beverage producing machine, in some embodiments a mechanical connection is provided between the dispensing nozzle and the movable auxiliary surface. The mechanical connection can be designed such that acting on the dispensing nozzle only, both the dispensing nozzle and the movable auxiliary surface are moved, or vice-versa. In some embodiments a linkage can be provided, directly or indirectly connected to the dispensing nozzle and co-acting with the movable auxiliary surface. The linkage can be designed and arrange to cause the movable auxiliary surface to pivot from the rest position to the operative position when the beverage dispensing nozzle is moved from the first position to the second position. Moreover the linkage can be designed and arranged such that said linkage causes the beverage dispensing nozzle to tilt from the second position to the first position when the movable auxiliary surface is moved from the operative position to the rest position. In other embodiments, the linkage arrangement can be such that: when the user tilts the movable auxiliary surface from the rest position to the operative position, the dispensing nozzle is also moved from the first position to the second position; and when the user moves the dispensing nozzle from the second position to the first position, the linkage causes the reversal movement of the movable auxiliary surface from the operating position to the rest position. These arrangements make it possible to switch from one operating position to the other in a simpler manner e.g. using only one hand to act on the dispensing nozzle and alternatively on the movable auxiliary surface, making adjustment of the beverage producing machine easier and more user-friendly.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 3 and 4 illustrate a perspective view of the dispensing nozzle and of the movable auxiliary surface in two operative positions corresponding to the positions of FIGS. 1 and 2 respectively;

DETAILED DESCRIPTION OF AN EMBODIMENT

Figure 1:
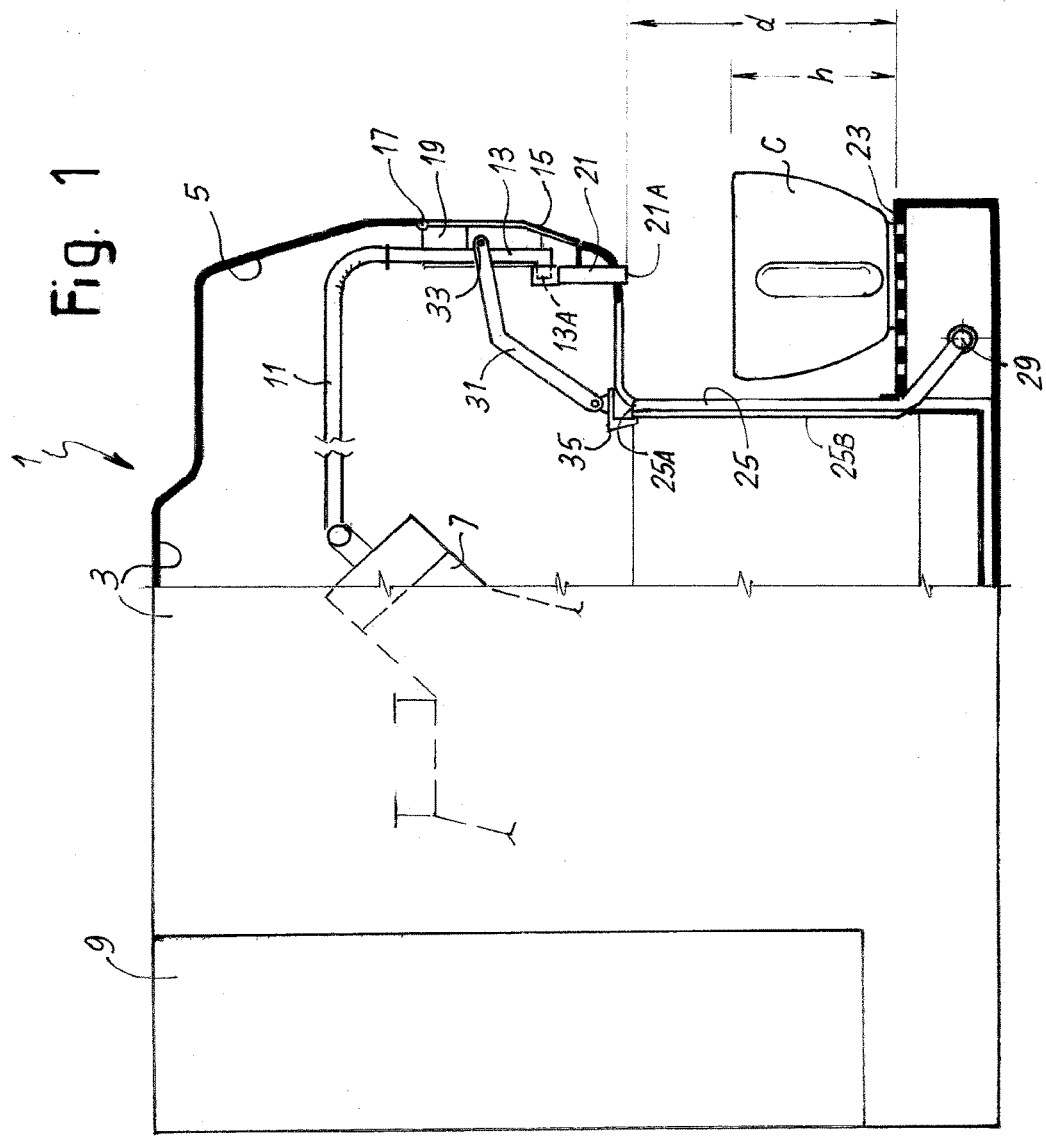
FIG. 1 illustrates a side and partial cross-sectional view of a beverage producing machine according to the invention with the dispensing nozzle arranged in a first position.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Here below reference will be made to a coffee machine. However, it shall be understood that the invention can be embodied also in other beverage producing machines, where the need may arise of using cups or containers of variable dimensions, with consequence need of adjusting the distance between a supporting surface for the beverage collecting container and the beverage dispensing nozzle.

In the drawings the coffee machine is labelled 1 as a whole. The coffee machine 1 includes a housing 3 with a front projecting portion 5. A beverage dispensing nozzle arrangement is housed in the front projecting portion 5 of the machine housing 3, as will be disclosed here below. In the exemplary embodiment described herein, a brewing unit 7 is also arranged in the housing 3. Other components, parts and instrumentalities are further provided in or around the housing 3, such as a water container, a water pump, a water heater, a central control unit, temperature and level sensors, coffee-capsule handling mechanisms, etc. These components, parts and instrumentalities are well known to those skilled in the art and will not be described in great detail herein.

In the rear part of the housing 3 a water container 9 can be provided, from which water is sucked by a pump, not shown, which feeds the water at the required pressure to a water heater to produce the required hot and pressurised brewing water to feed the brewing unit 7.

The brewing unit 7 is in fluid communication through a pipe 11 with a dispensing nozzle 13. In some embodiments the pipe 11 is at least partly flexible such that the beverage dispensing nozzle 13 can take up two different positions shown in FIGS. 1 and 2 and in FIGS. 3 and 4, respectively.

The dispensing nozzle 13 is constrained to a door or hatch 15. The door 15 is pivotally connected to the front part 5 of the housing 3 and can rotate around a substantially horizontal axis 17.

In the closed position (FIGS. 1 and 3) the door 15 closes a seat 19 provided in the front portion 5 of the housing 3. In said closed position, the beverage dispensing nozzle 13 is entirely housed within the seat 19. A distal end or final end 13A of the beverage dispensing nozzle 13 is mechanically connected to a spout 21 to establish a fluid connection between the dispensing nozzle 13 and the spout 21. In the embodiment shown in the drawings the spout 21 is substantially vertically oriented and its distal end 21A is facing a supporting surface 23, whereon a beverage collecting container, such as a cup C can be placed to collect the beverage produced by the machine 1.

The supporting surface 23 can be designed as an apertured grid provided with slots, holes or apertures 23A through which liquid can drop in a collecting tray arranged underneath the supporting surface 23 and not shown. The supporting surface 23 and the drip collecting tray can be movable for cleaning purposes.

The distance between the supporting surface 23 and the lower end of the spout 21 is such that a cup C can be placed on the supporting surface 23 to collect coffee dispensed through the spout 21. In order for the cup C to be placed in this position, the height (h) of the cup must be smaller than the distance (d) between the distal end 21A of the spout 21 and the resting surface 23.

If a larger (taller) beverage collecting container is used instead of the cup C, e.g. a glass, the position of the dispensing nozzle 13 will be modified and an auxiliary movable surface will be placed in a substantially horizontal position in order to place thereon the larger container, as will be disclosed here below.

In the position shown in FIGS. 1 and 3, the coffee or any other beverage produced by the machine 1 flows through the pipe 9, the beverage dispensing nozzle 13 and the spout 21 to be finally collected in the container C.

Figure 2:
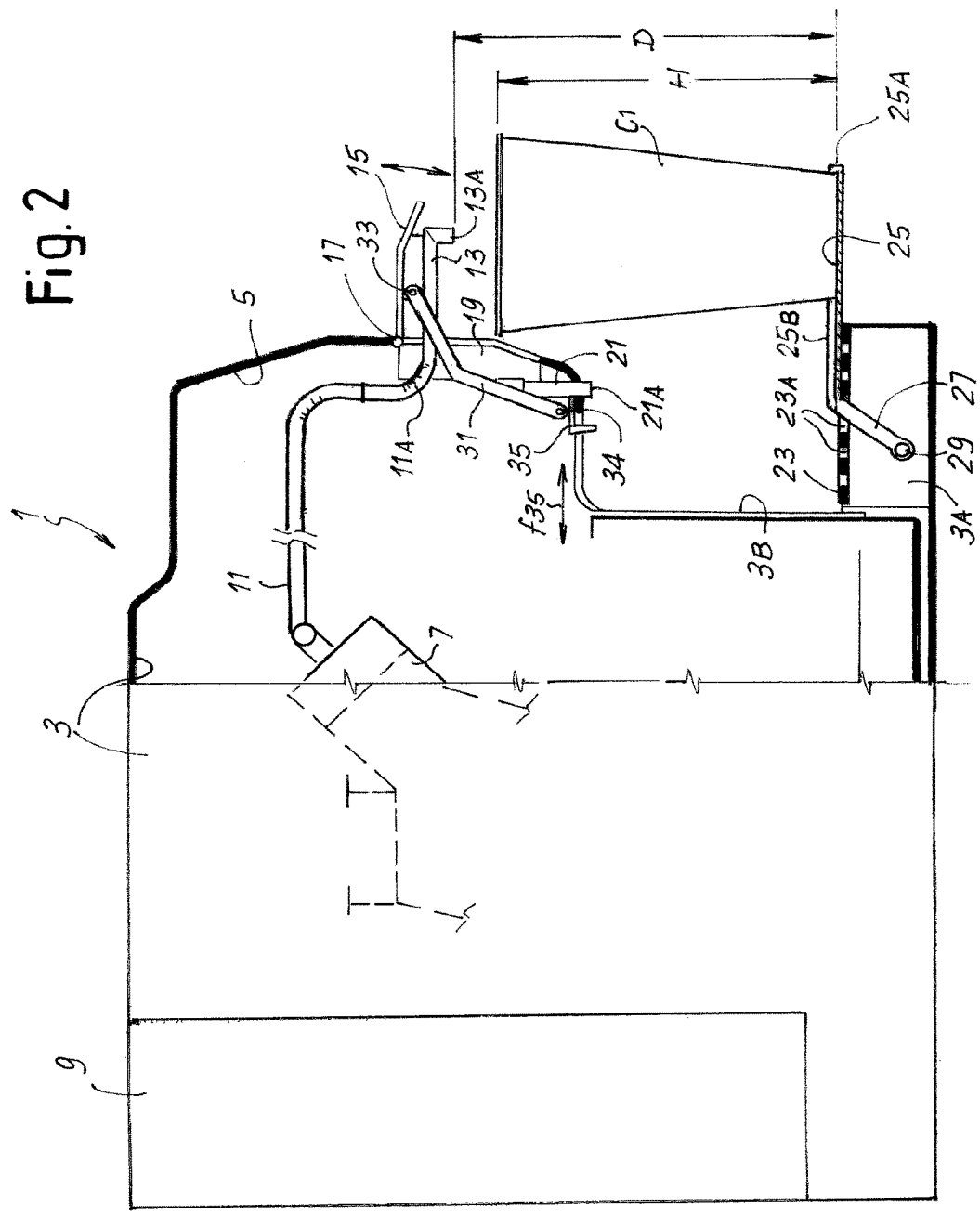
FIG. 2 illustrates the machine of FIG. 1 with the dispensing nozzle arranged in a second position.
Figure 6:
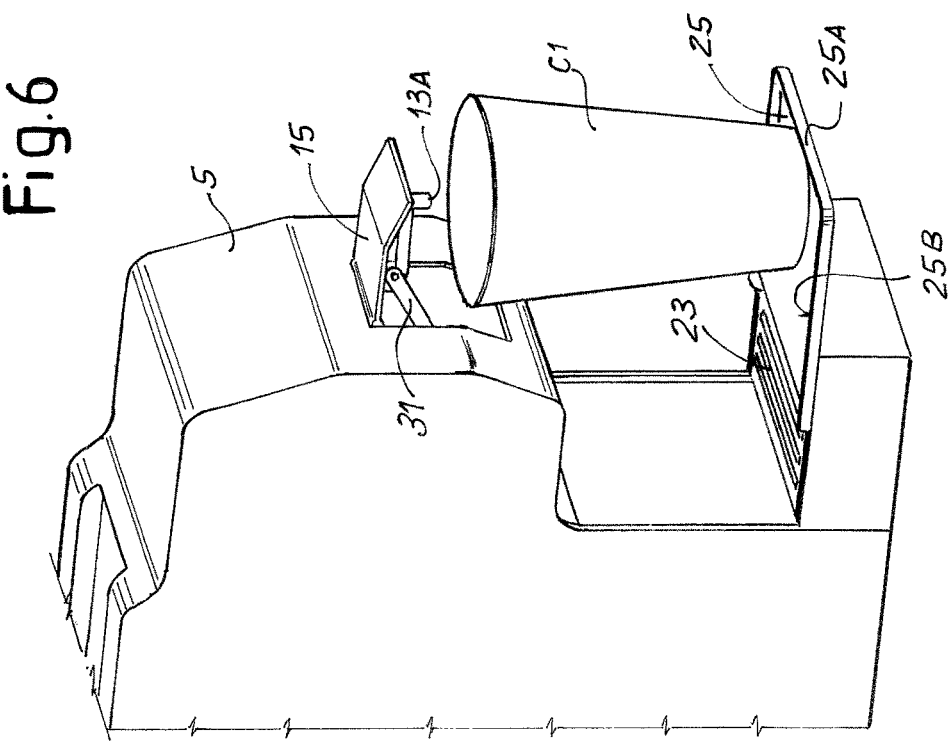
FIGS. 5 and 6 show a front view and a perspective view of the front portion of the machine in the position of FIG. 2.
Figure 5:
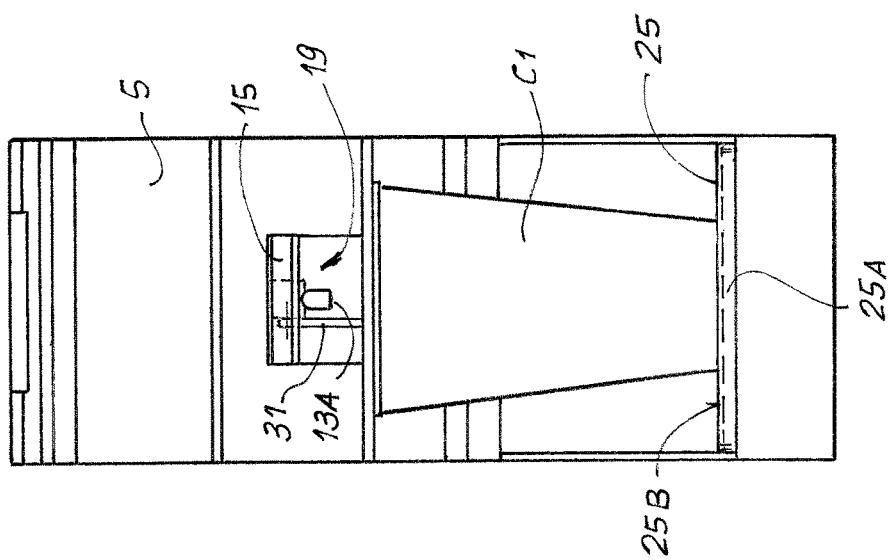

In FIGS. 2 and 4 the position of the beverage dispensing nozzle 13 has been modified in order to dispense the beverage in a higher container C1, e.g. a larger cup or a glass. For this purpose, the beverage dispensing nozzle 13 is rotated around the pivoting axis 17 by pivoting the door 15, whereto the beverage dispensing nozzle 13 is constrained. In this position the beverage dispensing nozzle 13 projects frontally outside the seat 19 provided in the projecting front portion 5 of the housing 3 of the machine 1. The distal end 13A of the beverage dispensing nozzle 13 is therefore separated from the spout 21 and is oriented downwardly towards the container C1.

The tilting motion of the beverage dispensing nozzle 13 is made possible by the flexibility of at least one portion of pipe 11, which will bend in 11A as shown in FIGS. 2 and 4.

Since the distal, outlet end 13A of the beverage dispensing nozzle 13 in this position projects outside the foot print of the machine, in the embodiment disclosed herein a movable auxiliary surface 25 is provided, which is normally recovered within the machine footprint, i.e. does not project outside the machine footprint and which is made to project therefrom only when required. The movable auxiliary surface 25 can be supported by a pair of pivoting arms 27 hinged at 29 to the housing 3 or a projection 3A thereof. In the embodiment shown in the drawings, the pivoting point of the movable auxiliary surface 25 and respective pivoting arms 27 is underneath the supporting surface 23 and the arms 27 move within corresponding slots 23S provided in the surface 23 on both sides thereof. The distance D between the dispensing nozzle 13 and the movable auxiliary surface 25 is larger than the height H of the container C1.

In some embodiments the movable auxiliary surface 25 is at least partly surrounded by a peripheral projection 25B, such that any liquid dripping on the movable auxiliary surface 25 will be prevented from dripping on the machine resting surface, e.g. a table or a shelf, but will rather be collected in the tray arranged underneath the apertured supporting surface 23. This can be obtained e.g. by providing a hole in the auxiliary surface 25 in the area overlapping the apertured supporting surface 23. In the embodiment shown in the figures, collecting of the liquid is made possible by the peripheral projection 25 being interrupted along the edge of the auxiliary surface 25 which is oriented towards the machine 1 and is overlapping the apertured surface 23.

In the position illustrated in FIGS. 3 and 4 the larger container C1 can be therefore supported by the movable auxiliary surface once the latter has been brought in the substantially horizontal position shown in the above mentioned figures, such that the auxiliary movable surface 25 and the container C1 are place underneath the outwardly projecting beverage dispensing nozzle 13, with the dispensing apertures at the distal end 13A of the beverage dispensing nozzle 13 being above the container C1.

As can be appreciated looking at FIGS. 2 and 4, in this position the auxiliary movable surface 25 is substantially parallel to the supporting surface 23 and projects beyond the latter outside and in front of coffee machine 1.

In order to move the dispensing nozzle 13 and the movable auxiliary surface 25 from the position of FIGS. 1 and 3 to the positions of FIGS. 2, 4, 5 and 6, in some embodiments a linkage between the door 15 and the movable auxiliary surface 25 is provided, such that the door 15 and the movable auxiliary surface 25 can be moved from one position to the other and vice versa acting upon only one of them, making the adjustment of the machine simpler.

In the embodiment illustrated in the drawings, the above mentioned linkage comprises two brackets 31 pivotally engaged to the door 15. Reference number 33 indicates a horizontally oriented pivoting axis around which the brackets 31 are hinged to the door 15, the axis 33 being parallel to the axis 17. The opposite ends of the brackets 31 are pivotally engaged at 34 to a sliding hooking member 35.

When the door 15 is pivoted, the pivoting movement thereof is transmitted by the brackets 31 to cause a sliding movement according to double arrow 35 of the hooking member 35 as can be understood looking at FIGS. 1 and 2.

The operation of the machine is as follows. If a small container, for example an espresso coffee cup C is used, the coffee machine 1 is set in the condition shown in FIGS. 1 and 3. The front door 15 is closed. The dispensing nozzle 13 is housed in the seat 19 and is in fluid connection through the distal end 13A thereof with the vertically oriented spout 21. Coffee produced by the brewing unit 7 flows through pipe 11, dispensing nozzle 13 and spout 21 directly in the cup C which has been placed on the supporting surface 23 arranged underneath the front portion 5 of the machine 1.

In this position the movable auxiliary surface is placed in a rest position wherein said movable auxiliary surface 25 is substantially vertical and abutting against a front panel 3B of the housing 3 of the machine 1, behind the area where the container or cup C is to be placed.

If the user wishes to use a larger container C1, all he has to do is to pivot the door 15 around the pivoting axis 17 to move it from the position of FIGS. 1 and 3 to the position of FIGS. 2, 4, 5 and 6. This pivoting movement, which can be facilitated e.g. by providing a grip on the door 15 (not shown) causes the following movement. The beverage dispensing nozzle 13 moves along with the door 15 from the substantially vertical position (FIGS. 1 and 3) to a substantially horizontal position, with the distal end 13A facing downwardly. The brackets 31 hinged to the door 15 perform a combined rotation and translation movement, which is transmitted to the hooking member 35, causing the latter to move from a withdrawn position (FIG. 1) to an extractive position (FIG. 2). This movement causes the movable auxiliary surface 25 to tilt downwardly from the vertical position to the horizontal. This is made possible because in the position shown in FIGS. 1 and 3 the upper edge 25A of the movable auxiliary surface 25 is located in front of the hooking member 35. Consequently, the sliding forward motion of the hooking member 35 pushes the movable auxiliary surface 25 outwardly from the rest position, until the latter finally tilts in the horizontal position by gravity.

The simple movement of the door 25 is therefore sufficient to bring both the beverage dispensing nozzle 13 as well as the movable auxiliary surface 25 in the operative position of FIGS. 2, 4-6.

When the user requires to move the machine back again from the position of FIGS. 2, 4-6 to the position of FIGS. 1 and 3, all he needs to do is to pivot the movable auxiliary surface 25 around the pivoting axis 29, back into the substantially vertical rest position. During this movement the upper edge 25A of the movable auxiliary surface 25, i.e. the edge opposite the pivoting axis 29, engages the hooking member 35 and draws it back in the original position shown in FIGS. 1 and 3. This sliding movement according to double arrow f35 is transmitted by means of brackets 31 to the door 15 which is thus tilted around the pivoting axis 17 back towards the closed position shown in FIGS. 1 and 3. The beverage dispensing nozzle 13 is brought back into the position with the distal end 13A in fluid communication with the proximal end of the dispensing spout 21.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A beverage producing machine comprising:
   a housing including a front projecting portion;
   a supporting surface on which a beverage collecting container can be placed;
   a beverage dispensing nozzle having a distal outlet end housed in the front projecting portion, arranged above said supporting surface configured to dispense a beverage;
   a brewing unit in fluid communication through a pipe with the beverage dispensing nozzle;
   wherein a movable auxiliary surface is combined to said supporting surface, said movable auxiliary surface being movable between an operative position in which said movable auxiliary surface is substantially parallel to said supporting surface, and a rest position in which said movable auxiliary surface is removed from said supporting surface;
   wherein said beverage dispensing nozzle is rotatably movable about a pivot axis between a first position for dispensing said beverage in said beverage collecting container placed on said supporting surface, and a second position for dispensing said beverage in said beverage collecting container placed on said movable auxiliary surface,
   wherein in said first position, the dispensing nozzle is housed in a seat provided in the projecting front portion of the housing with the dispensing nozzle oriented such that the distal outlet end faces the housing, and wherein the distal outlet end of the dispensing nozzle is in fluid communication with a vertically oriented spout,
   wherein in said second position, the beverage dispensing nozzle is rotated upwardly around the pivot axis such that the beverage dispensing nozzle projects away from the housing and frontally outside the seat and wherein the distal outlet end faces downwardly; and
   wherein said pipe is at least partially flexible such that the dispensing nozzle can take up said first and second positions for dispensing said beverage in said beverage collecting container.

2. The beverage producing machine according to claim 1, wherein the beverage dispensing nozzle is provided with a tilting motion to be moved from said first position to said second position and from said second position to said first position.

3. The beverage producing machine according to claim 1, wherein the movable auxiliary surface is pivotable around an axis substantially parallel to the supporting surface.

4. The beverage producing machine according to claim 3, wherein said movable auxiliary surface is pivotally engaged to said housing or to an extension thereof.

5. The beverage producing machine according to claim 1, wherein in said rest position the movable auxiliary surface is placed adjacent said housing and substantially orthogonal to the supporting surface.

6. The beverage producing machine according to claim 1, wherein in a working position the movable auxiliary surface projects with respect to said housing beyond the supporting surface and wherein in said second position the beverage dispensing nozzle projects from said housing.

7. The beverage producing machine according to claim 1, wherein said spout is fixedly arranged in said housing and above said supporting surface, such that the beverage is dispensed from said beverage dispensing nozzle through said spout; and in the second position the beverage dispensing nozzle is arranged to dispense said beverage directly from the beverage dispensing nozzle.

8. The beverage producing machine according to claim 7, wherein said spout is mounted on the front portion of the housing facing the supporting surface arranged underneath.

9. The beverage producing machine according to claim 1, wherein said movable auxiliary surface is hinged to the main body of the housing underneath said front portion.

10. The beverage producing machine according to claim 1, wherein said seat is closed by a door, to which the beverage dispensing nozzle is constrained such that the beverage dispensing nozzle is moved from said first position to said second position and vice-versa by opening and closing said door.

11. The beverage producing machine according to claim 1, comprising a linkage element including two brackets between said beverage dispensing nozzle and said movable auxiliary surface, transmitting a movement between said beverage dispensing nozzle and said movable auxiliary surface or vice-versa.

12. The beverage producing machine according to claim 1,
wherein the beverage dispensing nozzle is constrained to a linkage co-acting with the movable auxiliary surface;
wherein said linkage causes said movable auxiliary surface to pivot from the rest position to the operative position when the beverage dispensing nozzle is moved from the first to the second position; and said linkage causes the beverage dispensing nozzle to tilt from the second position to the first position when the movable auxiliary surface is moved from the operative position to the rest position.

13. The beverage producing machine according to claim 10,
wherein the beverage dispensing nozzle is constrained to a linkage co-acting with the movable auxiliary surface;
wherein said linkage causes said movable auxiliary surface to pivot from the rest position to the operative position when the beverage dispensing nozzle is moved from the first to the second position; and said linkage causes the beverage dispensing nozzle to tilt from the second position to the first position when the movable auxiliary surface is moved from the operative position to the rest position; and
wherein said linkage comprises a translating arm hinged to said door and provided with a sliding hooking member; said hooking member being engageable by the movable auxiliary surface when the beverage dispensing nozzle is in the second position and the movable auxiliary surface is moved from the operative position to the rest position; said hooking member pushing said movable auxiliary surface from said rest position towards said operative position when the beverage dispensing nozzle is moved from the first position to the second position.

14. The beverage producing machine according to claim 1, wherein said movable auxiliary surface is provided with a peripheral projection, for preventing liquid from dripping from said movable auxiliary surface.

15. The beverage producing machine according to claim 14, wherein said projection partly surrounds said movable auxiliary surface.

* * * * *